UNITED STATES PATENT OFFICE.

FRANZ HENLE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

MANUFACTURE OF AMINO-ARYL-ACIDYL-AMINO-ANTHRAQUINONES AND THEIR ACIDYL DERIVATIVES.

989,602.  Specification of Letters Patent.  Patented Apr. 18, 1911.

No Drawing.  Application filed May 9, 1910. Serial No. 560,344.

*To all whom it may concern:*

Be it known that I, FRANZ HENLE, Ph. D., chemist, a citizen of the Empire of Germany, residing at Höchst-on-the-Main, Germany, have invented certain new and useful Improvements in the Manufacture of Amino-Aryl - Acidyl - Amino - Anthraquinones and Their Acidyl Derivatives, of which the following is a specification.

I have found that hitherto unknown amino-aryl-acidyl-aminoanthraquinones are obtained by reducing the nitro-aryl-acidyl-aminoanthraquinones of the general formula:—(anthraquinone) $NH.CO.R.NO_2$, (in which "R" represents an aromatic residue, such as phenyl, tolyl, anthraquinonyl) such as are, for instance, produced by condensing aminoanthraquinones and nitroarylic acid chlorids. The most suitable reducing agents are: hydrosulfite, or zinc dust, or iron and caustic soda lye. The said result of the reaction could not be foreseen, because, first of all, a saponification of the acidyl derivatives was to be expected.

The bodies obtainable by the present process have the composition

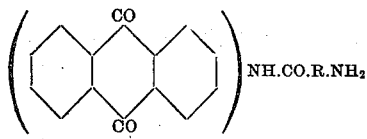

(in which "R" represents any aromatic residue), and dye unmordanted cotton from the vat yellow to red tints. The shade and fastness of the dyeings thus obtained can be considerably improved by subjecting the above described substances to the action of acidylating agents, particularly acid chlorids and acid anhydrids. In this manner the acidyl-amino-aryl-acidyl - aminoanthraquinones substituted in the amido group are obtained which generally form yellow-colored bodies of high melting point.

Example I: 37.2 grams of para-nitrobenzoyl-α-aminoanthraquinone are mixed and stirred for some hours at 50–60° C. without access of air, with 500 ccm. of caustic soda lye of 10% strength and 90 grams of dry sodium hydrosulfite. From the violet solution the para-amino-benzoyl-α-aminoanthraquinone is precipitated, with an almost theoretical yield, by means of air. This para - amino - benzoyl-α-aminoanthraquinone when dried is a yellowish-red powder and, on being recrystallized from about 20 parts of nitrobenzene, it forms brownish-red small crystals which melt at over 300° C.

The new product is nearly insoluble in alcohol, ether, acetone, benzene, etc., and yields when treated with hydrochloric acid or sulfuric acid lemon-colored, salts capable of being hydrolyzed. Its yellow solution in concentrated sulfuric acid assumes when heated with trioxymethylene a violet coloration. The para-amino-benzoyl-α-aminoanthraquinone dyes cotton from a violet-red vat brownish-yellow tints.

For obtaining the benzoyl derivative, para-amino - benzoyl - α - aminoanthraquinone is mixed in a boiling solution of nitrobenzene with a little more than the quantity of benzoyl chlorid calculated for one molecule. The condensation product which forms with evolution of hydrogen chlorid, separates in yellow crystals and is washed with alcohol or ether. Benzoyl - para - aminobenzoyl - α - aminoanthraquinone, which melts at 315° C., can be recrystallized from nitrobenzene and is difficultly soluble in the usual organic solvents. It dyes cotton from a violet vat yellow shades. In the same manner yellow condensation products of a high melting point and capable of being recrystallized from nitrobenzene are obtained by substituting for the benzoyl chlorid, described in the above example, the ortho- or meta- or para-nitrobenzoyl chlorid, or the chlorid of anthraquinone-β-carboxylic acid, the chlorocarbonic acid ester, the succinic acid chlorid, the phthalyl chlorid or the like. Also the anthraquinonyl urea chlorid reacts easily in nitrobenzene solution with para-amino-benzoyl-aminoanthraquinone forming then a yellow condensation product melting at over 300° C. By treatment with phosgen in the cold the corresponding urea chlorid of the constitution $C_{22}H_{13}O_3N_2Cl$ is in the first place obtained and this can be further transformed.

Example II: The brownish-yellow para-amino - benzoyl - β - aminoanthraquinone of melting point 246° C., which is obtained in the same manner, may also be recrystallized from nitrobenzene. It is slightly soluble in most of the organic solvents, it forms when treated with mineral acid almost colorless salts capable of being hydrolyzed; it can be diazotized but does not undergo any reaction with formaldehyde. The product dyes cotton from a red vat yellow tints. By treating it with acid chlorids it is transformed into acidyl compounds which are mostly of a fainter yellow color than the corresponding a derivatives.

Example III: If in the preceding examples meta- or ortho-nitrobenzoyl compounds are substituted for the para-nitrobenzoyl compounds, the corresponding derivatives of the meta- or ortho-series are obtained, viz:—meta-amino-benzoyl-α-amino-anthraquinone which does not melt within the limits of the thermometer, and meta-amino-benzoyl-β-aminoanthraquinone melting at 216° C. The bodies of the meta series are of lighter color than the corresponding bodies of the para- or ortho-series, but otherwise they behave like the latter.

The following tabular statements show the chemical and physical properties of some of the amino-aryl-acidyl-aminoanthraquinones (Table I.), and of some of the acidyl-amino-aryl-acidyl-aminoanthraquinones (Table II.), obtainable by the herein described process.

*Table I.*

| | Melting point. | Solubility. | Salts of mineral acids. | Color, when treated with conc. sulfuric acid and trioxymethylene. | Color of the vat. | Dyeing cotton. |
|---|---|---|---|---|---|---|
| p-aminobenzoyl-α-aminoanthraquinone | Over 300° | Soluble in nitro-benzene and pyridin, almost insoluble in the usual organic solvents. | Difficultly soluble, lemon-colored. | Violet | Violet-red | Brownish-yellow. |
| m-aminobenzoyl-α-aminoanthraquinone | Over 300° | | | do | do | Yellow. |
| o-aminobenzoyl-α-aminoanthraquinone | 250° | | | do | do | Reddish-yellow. |
| p-aminobenzoyl-β-aminoanthraquinone | 246° | do | Almost colorless, otherwise as above. | None | Red | Yellow. |
| m-aminobenzoyl-β-aminoanthraquinone | 216° | | | do | do | Faint-yellow. |
| 3.5-diaminobenzoyl-α-aminoanthraquinone | 250° | do | Yellow | Violet | do | Yellow. |
| 3.5-diaminobenzoyl-β-aminoanthraquinone | 202° | | Colorless | None | do | Do. |
| Di-p-aminobenzoyl-1.5-diaminoanthraquinone. | Infusible | Very difficultly soluble even in nitrobenzene. | Yellow | Brownish-violet. | do | Reddish-brown. |
| Aminoanthraquinone-carboxy-α-aminoanthraquinone. | 230° | Pretty readily soluble in nitrobenzene and in chlorobenzene. | Yellow. Formation of salts occurs only when treated with highly concentrated acids. | Violet | Blackish-red | Brownish-red. |
| Diaminoanthraquinone-carboxy-1.5-diaminoanthraquinone. | Infusible | Insoluble | do | do | Almost black | Reddish-brown. |

*Table II.*

| From: | And: | Melting point. | Solubility in nitrobenzene. | Color of the vat. | Dyeing cotton. |
|---|---|---|---|---|---|
| p-aminobenzoyl-α-aminoanthraquinone | Benzoyl chlorid. | 315° | Very difficultly soluble. | Violet | Yellow. |
| p-aminobenzoyl-α-aminoanthraquinone | Chlorid of anthraquinone carboxylic acid. | 280° | do | Blackish-violet. | Do. |
| p-aminobenzoyl-α-aminoanthraquinone | β-anthraquinonyl urea chlorid. | Over 300° | Difficultly soluble. | Violet | Do. |
| m-aminobenzoyl-α-aminoanthraquinone | do | 285° | More readily soluble. | Violet-red | Do. |
| p-aminobenzoyl-β-aminoanthraquinone | do | Over 300° | do | Red | Do. |
| 3.5-diaminobenzoyl-α-aminoanthraquinone | β-anthra-quinonyl urea chlorid (2 molecules). | At 250° decomposed. | do | do | Do. |
| Di-p-aminobenzoyl-1.5-diaminoanthraquinone | do | Over 300° with decomposition. | Difficultly soluble. | do | Brownish-yellow. |
| Aminoanthraquinonecarboxy-α-aminoanthraquinone. | Benzoyl chlorid. | 300° | Readily soluble. | Reddish-black. | Yellow. |

Having now particulary described my invention, what I claim is:

1. The process of manufacturing amino-aryl-acidyl-aminoanthraquinone, which consists in treating with a reducing agent the condensation products, obtainable in the usual manner by condensing an aminoanthraquinone with a nitroarylic acid chlorid.

2. The process of maunfacturing acidyl-amino-aryl-acidyl-aminoanthraquinones, which consists in treating with an acidylating agent an aminoarylacidylaminoanthraquinone, obtainable by condensing in the usual manner an aminoanthraquinone with a nitroarylic acid chlorid and subsequently reducing the condensation product, as hereinbefore described.

3. As new articles of manufacture, amino-aryl-acidyl-aminoanthraquinones, obtainable by condensation of an amino-anthraquinone with a nitroarylic acid chlorid and subsequent reduction; which products are yellow to reddish-brown compounds, insoluble in water, dilute acids and alkalis, soluble only in some organic solvents of high boiling point, such as nitrobenzene, forming, when treated with alkaline hydrosulfite, red- to black-colored vats from which cotton is dyed yellow to brown tints.

4. As new articles of manufacture, acidyl-amino-aryl-acidyl-aminoanthraquinones, obtainable by condensation of an aminoanthraquinone with a nitroarylic acid chlorid, subsequent reduction and acidylation by means of an acid chlorid; which products are yellow to reddish-brown compounds, insoluble in water, dilute acids and alkalis, soluble only in some organic solvents of high boiling point, such as nitrobenzene, forming, when treated with alkaline hydrosulfite, red to black colored vats, from which cotton is dyed yellow to brown tints.

In testimony whereof, I affix my signature in presence of two witnesses.

FRANZ HENLE.

Witnesses:
JEAN GRUND,
CARL GRUND.